US011979007B2

(12) United States Patent
O'Connell et al.

(10) Patent No.: US 11,979,007 B2
(45) Date of Patent: May 7, 2024

(54) ANTI-ROTATION DEVICE FOR CABLE STRINGING

(71) Applicant: Quanta Associates, L.P., Houston, TX (US)

(72) Inventors: Daniel Neil O'Connell, Burnaby (CA); David Karl Wabnegger, Burnaby (CA); Raymond Henry Jodoin, Burnaby (CA); Robert Wayne Palmer, Houston, TX (US); John Christopher Green, Calgary (CA)

(73) Assignee: Quanta Associates, L.P., Houston, TX (US)

( * ) Notice: Subject to any disclaimer, the term of this patent is extended or adjusted under 35 U.S.C. 154(b) by 631 days.

(21) Appl. No.: 17/127,662

(22) Filed: Dec. 18, 2020

(65) Prior Publication Data

US 2021/0210935 A1 Jul. 8, 2021

Related U.S. Application Data

(60) Provisional application No. 62/951,920, filed on Dec. 20, 2019.

(30) Foreign Application Priority Data

Dec. 20, 2019 (CA) .................................. CA 3065714

(51) Int. Cl.
*H02G 1/02* (2006.01)
*H02G 1/04* (2006.01)
*H02G 7/18* (2006.01)

(52) U.S. Cl.
CPC ................. *H02G 1/02* (2013.01); *H02G 1/04* (2013.01); *H02G 7/18* (2013.01)

(58) Field of Classification Search
CPC ............... H02G 1/02; H02G 7/18; H02G 1/04
See application file for complete search history.

(56) References Cited

U.S. PATENT DOCUMENTS

| 2,663,748 | A | * | 12/1953 | Carr | ........................ | F16G 11/06 |
| | | | | | | 254/134.3 R |
| 3,011,765 | A | | 12/1961 | Sherman | | |

(Continued)

FOREIGN PATENT DOCUMENTS

| CN | 108365569 A | 8/2018 |
| DE | 650978 C | 10/1937 |

(Continued)

OTHER PUBLICATIONS

Young, Lee, PCT International Search Report for PCT/US20/66159, dated Mar. 23, 2021, 2 pages, ISA/US, Alexandria, Virginia, United States.
Young, Lee, PCT Written Opinion of the International Searching Authority for PCT/US20/66159, dated Mar. 23, 2021, 4 pages, ISA/US, Alexandria, Virginia, United States.

(Continued)

*Primary Examiner* — Steven T Sawyer
(74) *Attorney, Agent, or Firm* — Oathout Law Firm; Elizabeth Gray; Antony C. Edwards

(57) ABSTRACT

An anti-rotation device is provided for stringing a cable or wire while reducing a twisting moment of the cable or wire as it is strung. The device includes a tow component, having multiple tow sections pivotally connectable end-to-end. A plurality of insulated weighted tail components are suspended so as to hang from the tow component. Each of the insulated tail components include weighted tail sections releasably connectable end-to-end to one another. At least one electrically insulated tail section is provided in each insulated tail component between the tow component and the weighted tail sections. The tail components are constrained to only articulate relative to the tow component in the single plane of bending of the tow component.

12 Claims, 12 Drawing Sheets

(56) References Cited

U.S. PATENT DOCUMENTS

| | | | |
|---|---|---|---|
| 3,222,033 A | * | 12/1965 | Doel .................. H02G 1/04 |
| | | | 254/134.3 R |
| 3,326,528 A | | 6/1967 | Mcintyre |
| 3,558,258 A | | 1/1971 | Johnson |
| 4,431,165 A | | 2/1984 | Chapman |
| 4,805,878 A | | 2/1989 | Dickey et al. |
| 7,434,784 B2 | | 10/2008 | Tjader |

FOREIGN PATENT DOCUMENTS

| | | |
|---|---|---|
| DE | 952831 C | 11/1956 |
| DE | 19839739 | 5/2012 |
| KR | 100672292 B1 | 1/2007 |

OTHER PUBLICATIONS

Hestroffer, Karine, Extended European Search Report, dated Dec. 1, 20226, 11 pages, European Patent Office, The Hague, Netherlands.
Furukawa Electric (FEIC), Rubber Cabtyre Cable, Sep. 2015, 40 pages, Tokyo, Japan, https://www.furukawa.co.jp/en/product/catalogue/pdf/tracab_d360e.pdf.
3M, Aluminum Conductor Composite Reinforced Installation Guidelines and Maintenance, Oct. 12, 2017, 53 pages, Austin, Texas, http://multimedia.3m.com/mws/media/5858200/3m-accr-installation-maintenance-guidelines.pdf.
CPA Global | The IP Platform, CPA Global Search Results; Title: Apparatus Used to String Cable; Date: May 10, 2019, 23 pages.
INAPI—Dinamarca COFRE Jose Anibal, Expert Report, Oct. 18, 2023, 25 pages, Instituto Nacional De Propiedad Industrial—INAPI, Chile.

* cited by examiner

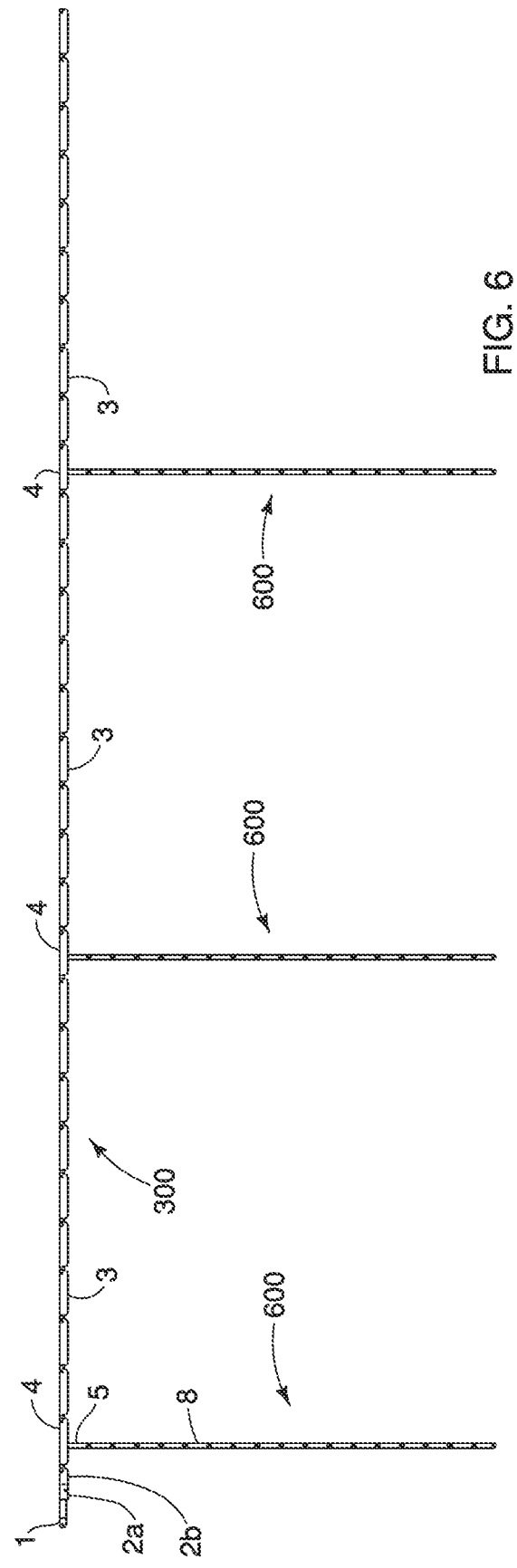

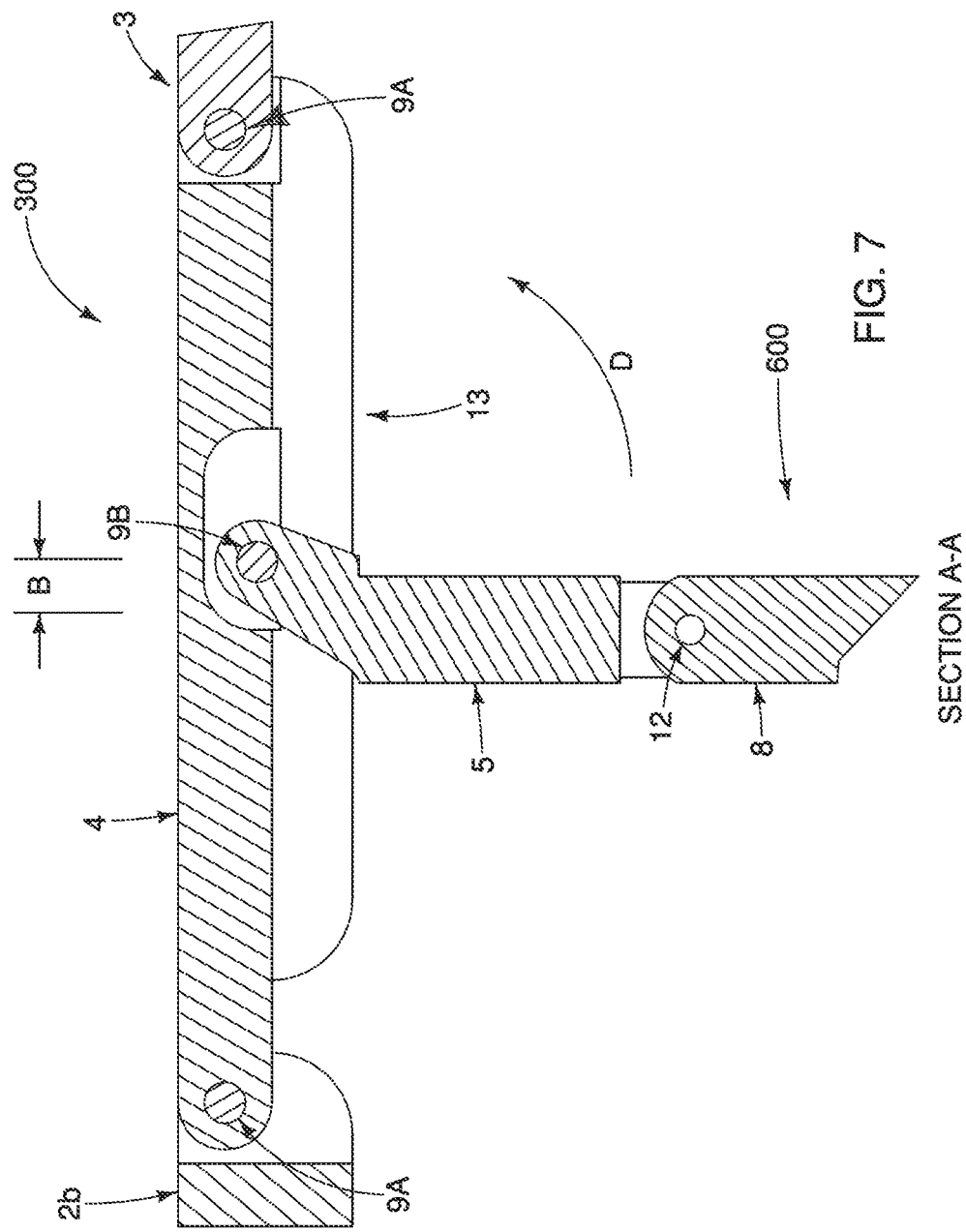

ANTI-ROTATION DEVICE FOR CABLE STRINGING

TECHNICAL FIELD

The present disclosure relates to a device to assist with resisting twisting of a cable or wire while stringing the cable along an electrical power transmission/distribution network and to protect workers and equipment by insulating the cable and pulling line if the anti-rotation device tails accidentally contacts an energized powerline.

BACKGROUND

Conductive and non-conductive cables are typically strung and installed along electrical power transmission/distribution networks. These cables are often formed from helically wound metal strands or wires.

The cables are pulled from a payout cable reel and passed through stringing blocks, travelers, sheaves or pulleys on supporting structures of the transmission/distribution network. Due to their helically wound construction, the cables have an inherent tendency to rotate or twist about the long axis of the cable in response to uncoiling forces while being pulled from the payout cable reel during stringing.

The tendency of cable to rotate or twist while being strung causes problems with strain and possible breakage or damage of the electrically conductive and non-conductive components in the cables due to the twisting forces. Twisting problems are particularly compounded when the cable is strung over an angular or irregular course where corners or turns are present.

Prior art devices have been designed with an aim to prevent such twisting. In most cases, the device includes a leader member or tow member connected at one end to the cable to be strung and at the other end to a pulling rope. One or more weighted sections are connected in series to form a tail and they are connected to the tow member by one end of the tail so as to hang down from the tow member. The tails counteract the twisting force or torque of the twisting cable.

In some cases, when twisting forces in the cable overcome the tails' resistance to the twisting, the tails may spin around the tow member about the long axis of the tow member. This is sometimes referred to as whip-lashing. Whip-lashing in addition to failing to prevent twisting of the cable, may be dangerous to the safety of personnel or equipment if the tails come in contact with adjacent wires which may be energized, thereby energizing the cable being strung, payout cable reel and pulling equipment.

In the prior art, the mass of the tail suspended from the tow member has been estimated to counter the force of the twisting rotation or torque in the cable. Generally, the tail is mounted at a point along the tow member such that the length of the tail can be accommodated in storage channels formed in and along the length of the tow member when the tail and tow member are simultaneously pulled through a pulley or sheave of the stringing system.

At least some weighted sections in the prior art are made from electrically conductive materials. In applicant's view, using electrically conductive materials along the entire length of a tail may present a further hazard since electrical charge is not prevented from travelling through the tails to the cable being strung, payout cable reel and pulling equipment so as to potentially injure personnel or damage equipment and property.

In the prior art applicant is aware of U.S. Pat. No. 4,805,878 which teaches a device having a line of weights consisting of a tube filled with weighted slugs or segments, wherein the weight of the weighted tube counteracts the tendency of the cable to twist.

U.S. Pat. No. 3,011,765 teaches a device having one or more articulated pendulums for counteracting the tendency of the cable to twist.

U.S. Pat. No. 2,663,748 teaches a device having one or more weighted arms comprised of a solid bar of material wherein the weight of each arm is calculated to oppose the twisting action of the tow line.

SUMMARY

An anti-rotation device is provided for resisting rotation of a cable as it is strung through a transmission/distribution network and to protect workers and equipment by insulating the cable and pulling line if the anti-rotation device tails accidentally contacts an energized powerline. The device includes a tow component connectable to the cable at one end, and a plurality of pendulum-like insulated weighted tails suspended from the tow component. The plurality of the tails may be located in a spaced apart array along the tow component. Each insulated tail includes one or more insulated tail sections and one or more weighted tail sections pivotally mounted end-to-end, and removably coupled, to one another. An uppermost electrically insulated tail section is coupled to a connecting section connecting the tail to the tow component where the insulated tail forms a rotating "T" junction with the tow component.

The anti-rotation device is, in one embodiment, produced by the process of a) determining a rotational force moment of the cable as it is strung through the transmission/distribution networks, and in particular through travelers or sheaves used for stringing the cable;

b) determining a weight and length requirement for each insulated tail in a spaced array of tails spaced along a tow component to collectively produce a counter-moment, to counter the rotational force moment of the cable acting on the insulated tails;

c) determining the number of insulated tails required to meet the weight and length requirement to collectively resist the rotational force moment acting to twist the cable; wherein the length of each insulated tail is constrained by the length of, and cannot exceed, the length of the spacing between insulated adjacent tails in the array of tails, and the widths of each insulated tail is constrained by the width of a tail-storage channel formed along the length of the bottom of the tow component, wherein the constrained length and width of each insulated tail, and the density of the material of each insulated tail determine its weight and the amount of counter-moment produced by each insulated tail, and d) connecting the required number of insulated tails, as determined in step (c), to the tow component, wherein each of the tails include at least one electrically insulated tail section adjacent the junction of the tail with the tow component, and a series of weighted non-electrically insulated tail sections coupled to the at least one electrically insulated tail section.

The anti-rotation device includes, in one embodiment, not intended to be limiting, a tow component having a plurality of tow sections connected end-to-end in the tow component.

The insulated tails in the array of tails are preferably spaced apart along the tow component such that a length of the tow section between each tail is at least equal to the insulated tail lengths, assuming that the insulated tails are all the same length. In some embodiments the insulated tails may be of different lengths, so long as the associated tail-storage channel in the corresponding tow component has at least a corresponding length.

The insulated weighted tails are adapted to provide a counter-moment, counter to the rotational force moment, wherein the counter-moment of each insulated weighted tail is substantially equal to the rotational force of the cable acting on each insulated weighted tail in the array of insulated weighted tails.

It is to be understood that other aspects of the present disclosure will become readily apparent to those skilled in the art from the following detailed description, wherein various embodiments of the disclosure are shown and described by way of illustration. As will be realized, the disclosure is capable of other and different embodiments and its several details are capable of modification in various other respects, all without departing from the spirit and scope of the present disclosure. Accordingly the drawings and detailed description are to be regarded as illustrative in nature and not as restrictive.

BRIEF DESCRIPTION OF THE DRAWINGS

A further, detailed, description of the disclosure, briefly described above, will follow by reference to the following drawings of specific embodiments of the disclosure. The drawings depict only typical embodiments of the disclosure and are therefore not to be considered limiting of its scope. In the drawings:

FIG. 5 is a top plan view of a further embodiment of the present device;

FIG. 6 is a side elevation view of FIG. 5;

FIG. 7 is a detailed cross sectional view taken along line A-A of FIG. 5 showing connection of insulated weighted tail to a tow section;

The drawings are not necessarily to scale and in some instances proportions may have been exaggerated in order to more clearly depict certain features.

DETAILED DESCRIPTION

The description that follows and the embodiments described therein are provided by way of illustration of an example, or examples, of particular embodiments of the principles of various aspects of the present disclosure. These examples are provided for the purposes of explanation, and not of limitation, of those principles and of the disclosure in its various aspects.

The present disclosure provides a description of one example of an embodiment of an anti-rotation device 100. The anti-rotation device 100 uses weights which are pivotally connected end-to-end to form a weighted tail 600 for bending in a first plane, plane A, where the weighted tail 600 provides a resistive moment to the cable, in a second plane substantially orthogonal to the first plane. The resistive moment is substantially equal to, or more than, the twisting, rotational forces or torque of the cable being strung.

Figure 1:
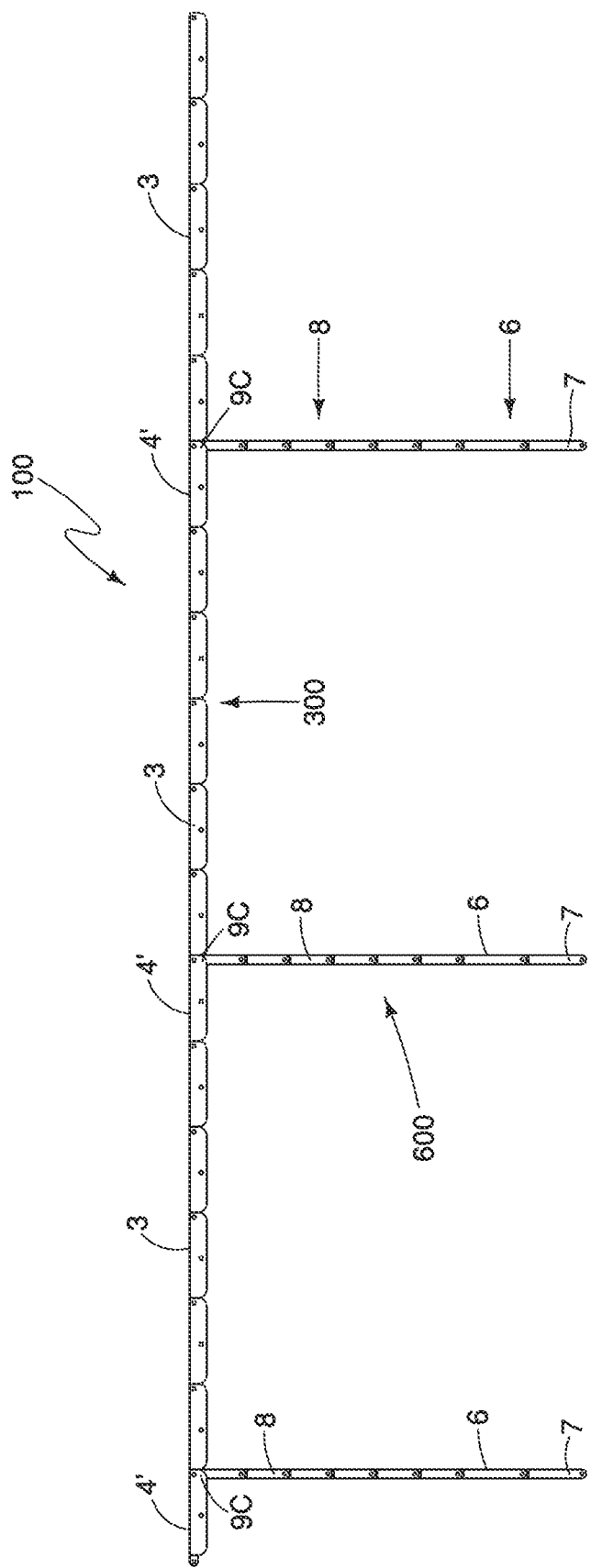
FIG. 1 is side elevation view of one embodiment of the present device.

With reference to the Figures, wherein like reference numerals depict corresponding parts in each view, as seen in FIG. 1, anti-rotation device 100 includes a tow component 300 and one or more insulated weighted tails 600 hanging from the tow component 300.

Figure 3:
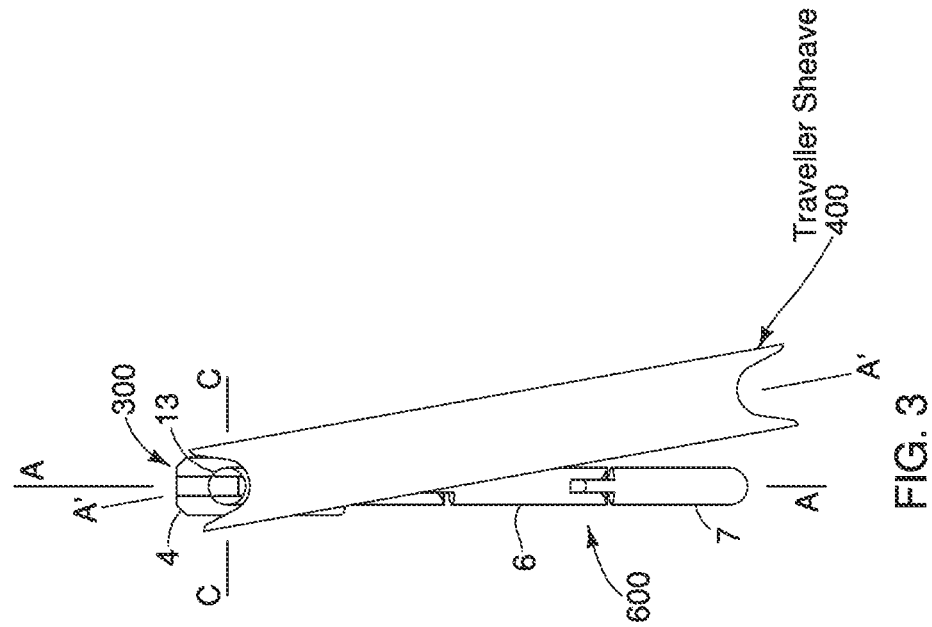
FIG. 3 is a detailed front elevation view of an insulated weighted tail and leading end of a tow section passing over a sheave used for stringing the cable.
Figure 4:
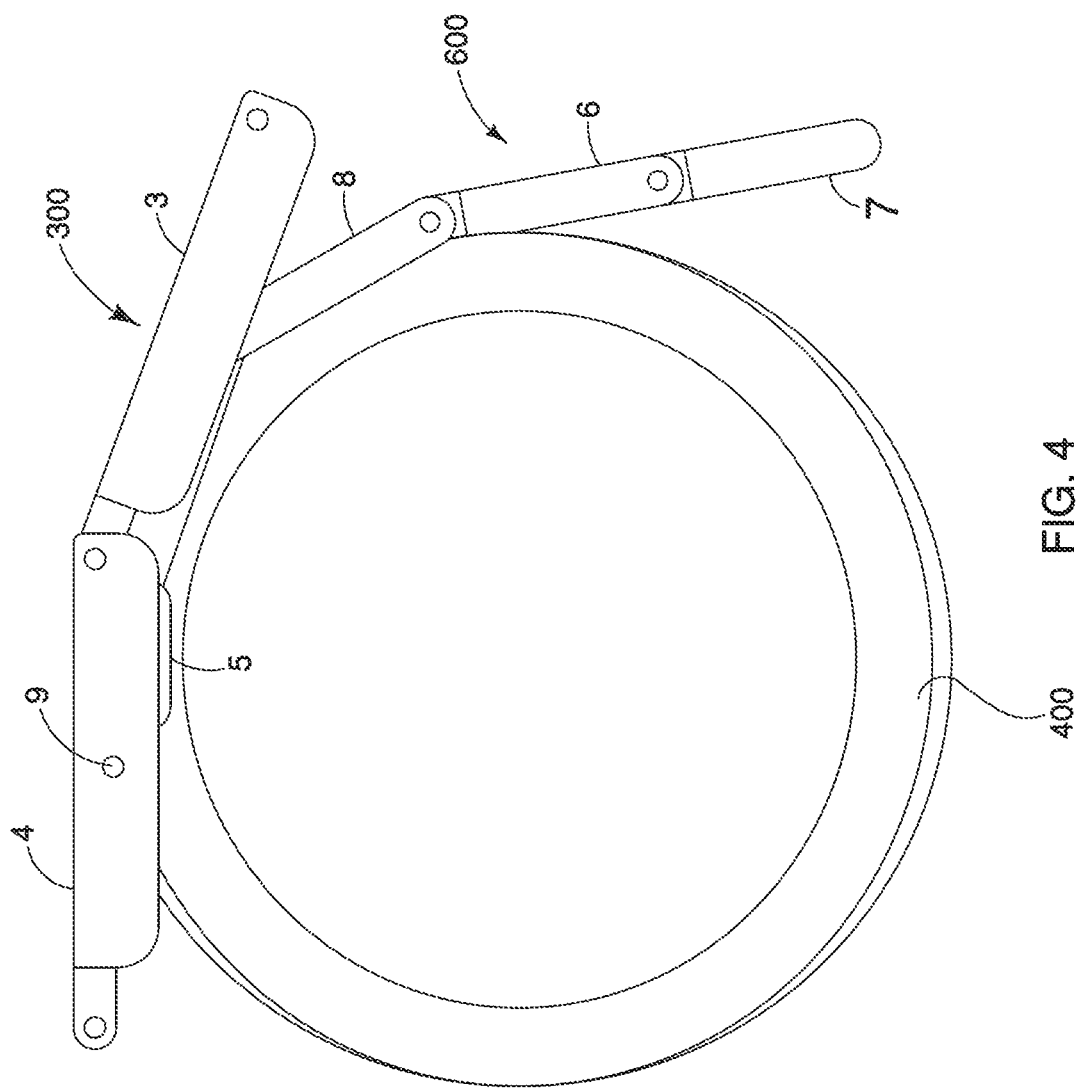
FIG. 4 is a side elevation view of FIG. 3.
Figure 8:
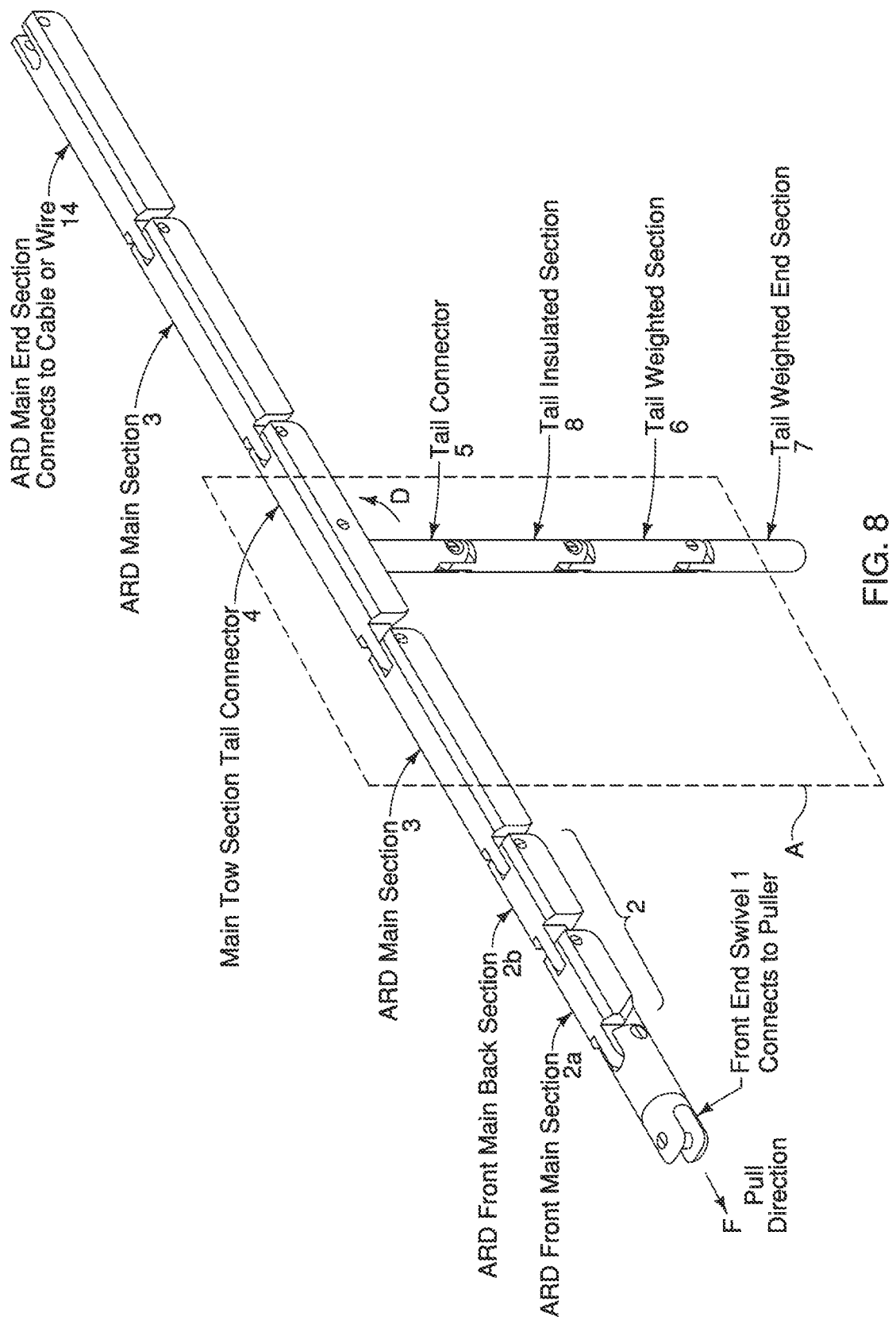
FIG. 8 is a detailed perspective view of the embodiment of FIG. 1 showing a portion of the tow component and an articulated insulated weighted tail, with sections removed for clarity of the view, suspended therefrom.

The tow component 300 is preferably comprised of a plurality of tow sections 3 that are pivotally connected end-to-end to one another to provide articulation which is restricted to the plane-of-bending, plane of bending "A" seen illustrated diagrammatically in FIG. 8, of the tow component 300. Tow component 300 bends when for example it is pulled over a traveler or sheave such as seen in FIG. 4 where tow component 300 is shown being pulled over a traveler or sheave 400. The plane of bending "A" of the tow component 300 is shown in dotted outline in FIG. 8 and coincides with a plane containing the tow and tail components 300 and 600 and the traveler or sheave 400, such as seen in FIGS. 3 and 4, when the tow and tail components are being simultaneously pulled through and over the traveler or sheave 400. A direction of pull F is shown by way of illustration in FIG. 8.

The tow sections 3 are preferably releasably connected to one another to allow adjustment of the length of the tow component 300 by removing or adding tow sections 3. The releasable connection between tow sections may advantageously be single degree of freedom hinges, such as pinned hinges 9, so as to constrain the bending articulation of the tow sections relative to one another to solely within the plane-of-bending A.

Figure 2:
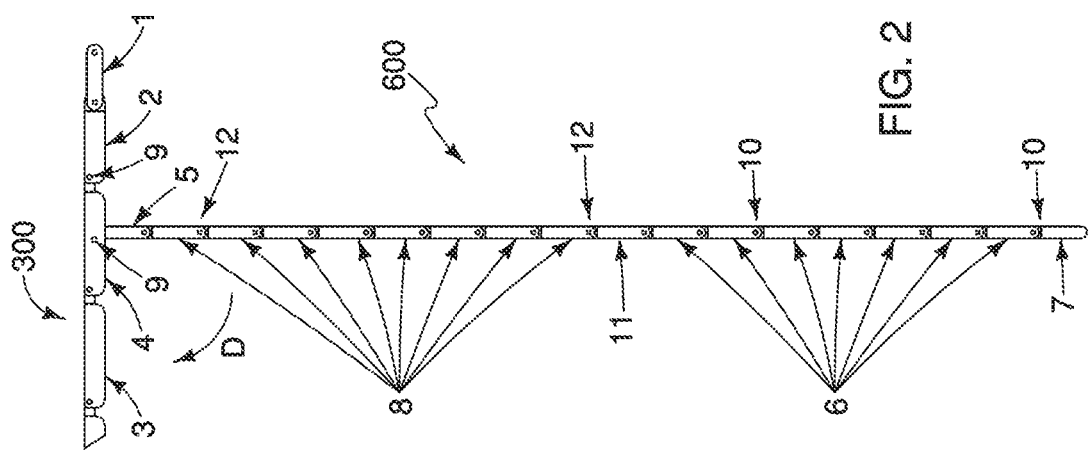
FIG. 2 is a detailed side elevation view of one embodiment of an insulated weighted tail connected to the tow section.
Figure 9:
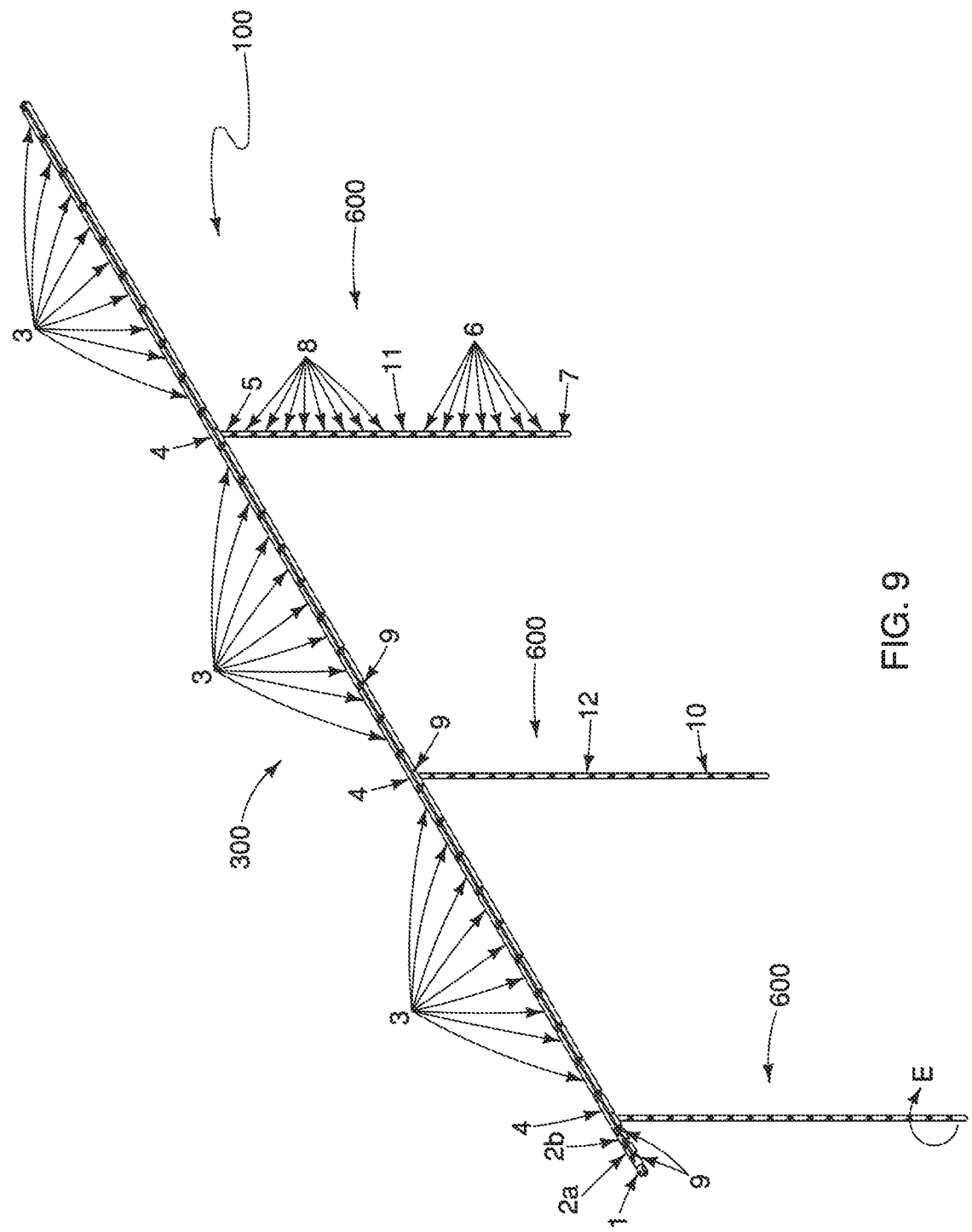
FIG. 9 is a perspective view encompassing the side elevation view of FIG. 2.
Figure 10:
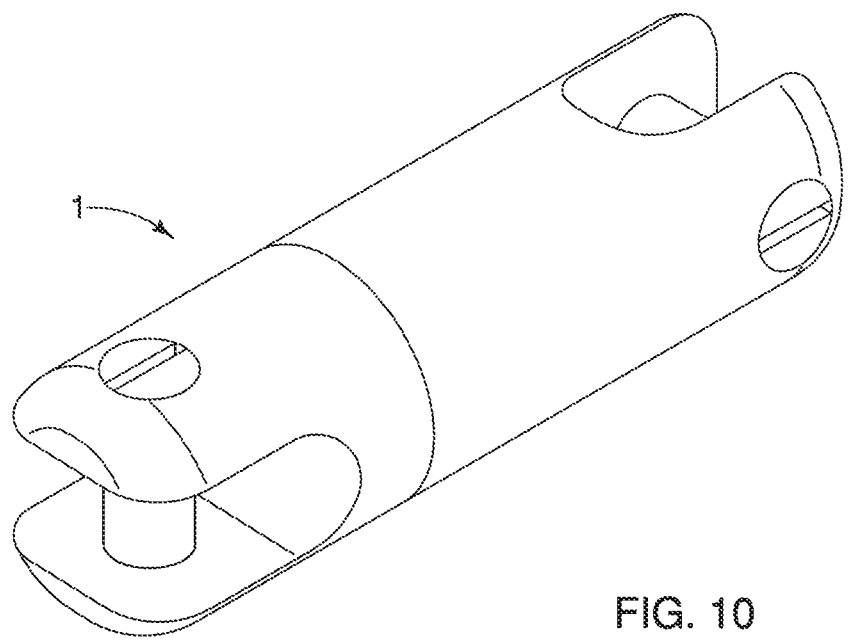
FIG. 10 is a perspective view of a conventional swivel for connecting the anti-rotation device to a pulling line.

The tow component 300 may also advantageously comprise a conventional swivel connection 1, as seen in FIGS. 2 and 9 and better seen in FIG. 10. A first end of swivel connection 1 is connected to the pulling line (not shown) to allow the pulling line to rotate and twist as it pulls the cable through the transmission/distribution network without affecting the operation of anti-rotation device 100.

The tow component 300 may also advantageously comprise one or more tail connector links interspersed between tow sections 3 along tow component 300. Two forms of tail connector links 4 as shown in FIGS. 2 through 9, 13, 15*a* and 15*b* and 4' as shown in FIG. 1 are illustrated. Tail connector links 4', although in applicant's view somewhat inferior to the design of tail connector links 4, are shown by way of example in FIG. 1 so as to emphasize that various forms of tail connector links could be made to work, and that the anti-rotation device of the present disclosure is not intended to be limited to the design of tail connector link 4.

As seen in FIG. 1, tail connector link 4' may be pivotally connected to electrically insulated weighted tail 600 by means of a hinged joint 9C at the leading end of tail connector link 4'. A dog leg offset tail connector section 5 may be employed to provide the advantageous offset described below which assists in the folding of the weighted tail up flush into a storage channel in the bottom of tow component 300. However, the embodiment in FIG. 1 illustrates that the use of a dog leg section 5 is also not required, as other forms of connecting the insulated weighted tails to the tow component will also work. In FIG. 1 insulated weighted tail 600 is mounted to tow component 300 at joint 9C. Joint 9C is formed in the side walls, at the leading end of the tail storage channel in tail connecting link 4'. This design is in applicant's view not as preferable as the design of tail connector links 4, such as seen in FIGS. 2 and 6, for the reasons set out below.

As seen in FIGS. 2 and 6, tail connector links 4 are connected to and inter-spaced between tow sections 3 along the length of the tow component 300. Like tail connector links 4', tail connector links 4 serve to support the insulated weighted tails 600 which are suspended in a pendulum like manner from the tow component 300. Tail connector links 4 connect the front links 2 to tow sections 3 and may connect the tail section 5 to a tow section 3. The front nose piece on tail connector 4 is long and narrow to allow the tow sections to rotate with each other up to 90° when pulled over stringing traveler or sheave 400 such as seen in FIG. 4. The smaller the traveler diameter the bigger angle of rotation that is required. Storage channel 13 is formed along the underside of tail connector 4 and tow section 3 to accommodate the tail sections swinging up into flush temporary storage in channel 13 when the tow component is running over a stringing traveler or sheave 400.

Figure 12:
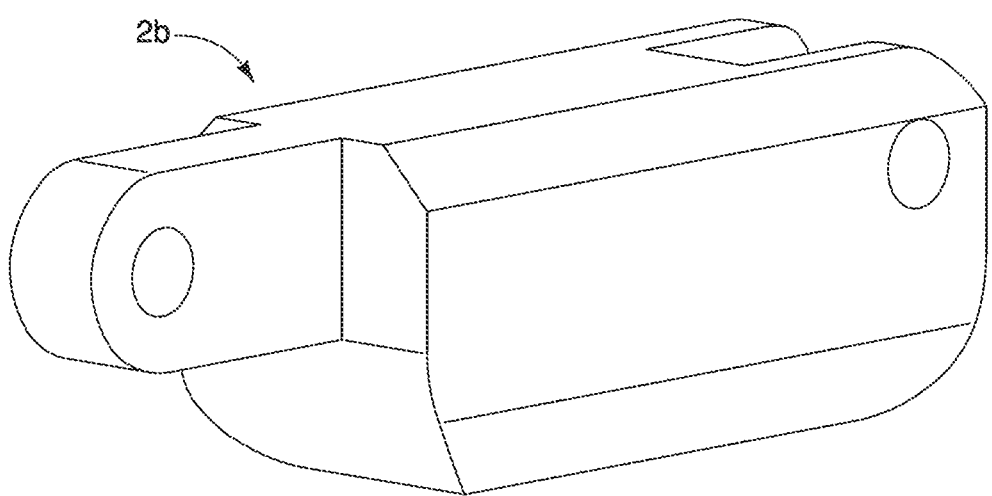
FIG. 12 is a perspective view of the back half section of the front main section which couples behind the front half section of FIG. 11.
Figure 11:
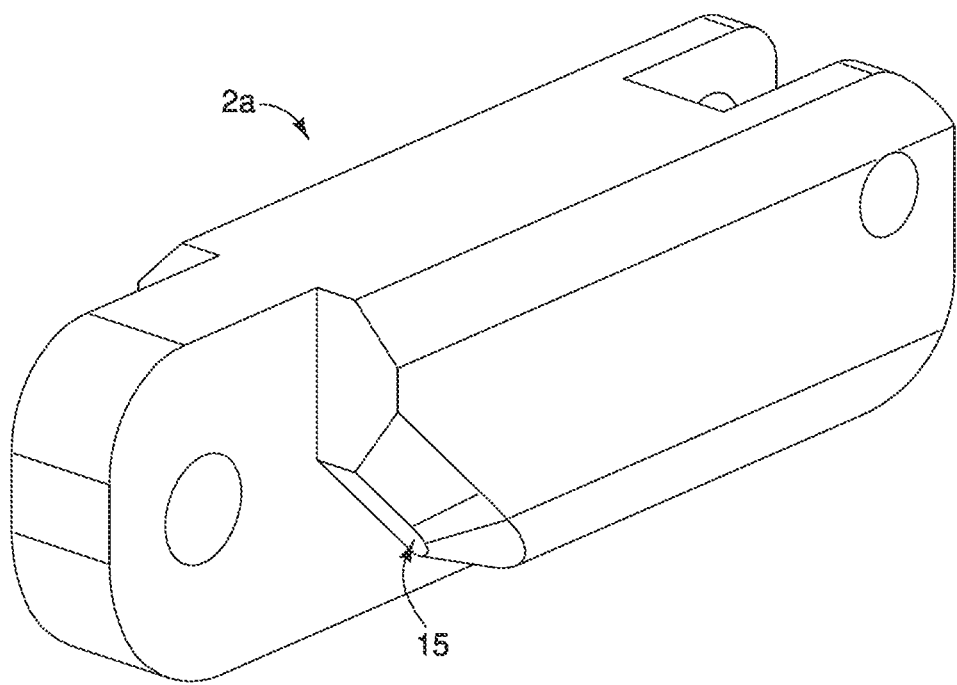
FIG. 11 is a perspective view of the front half section of the main section which couples behind the swivel of FIG. 10.
Figure 13:
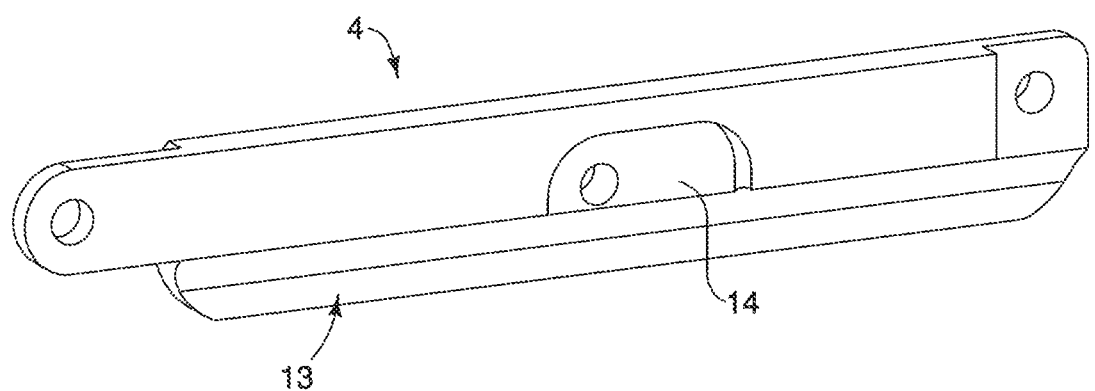
FIG. 13 is the section through the tail connecting link of FIG. 7 showing the cutout for the dog leg offset arm of the tail connector of FIG. 14.
Figure 14:
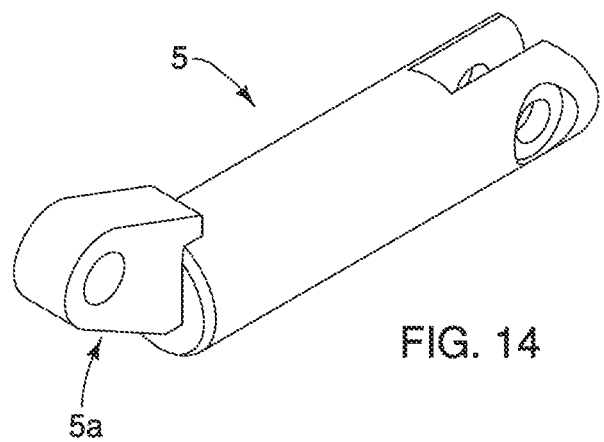
FIG. 14 is a perspective view of the dog leg offset arm of the tail connector of FIG. 7.
Figure 15A:
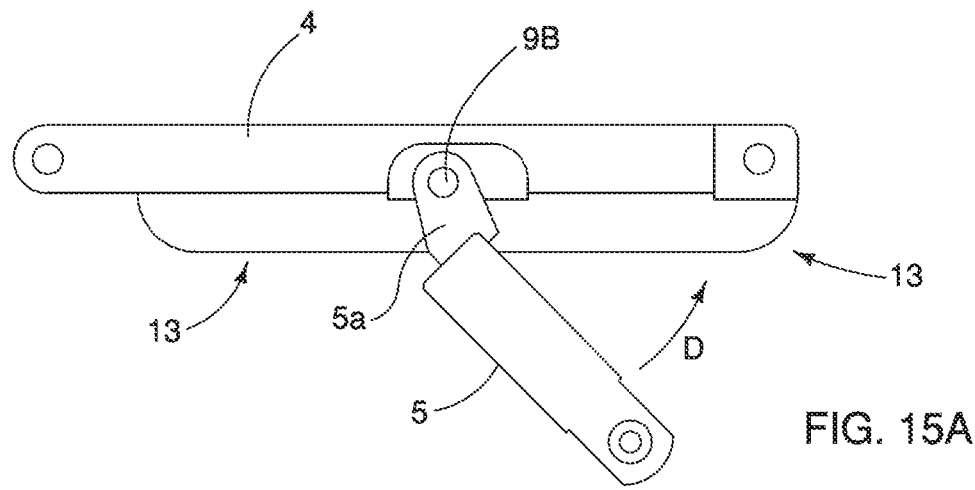
FIG. 15a shows the tail connector of FIG. 7 pivoting from the free hanging position in FIG. 7 towards its storage position.
Figure 15B:
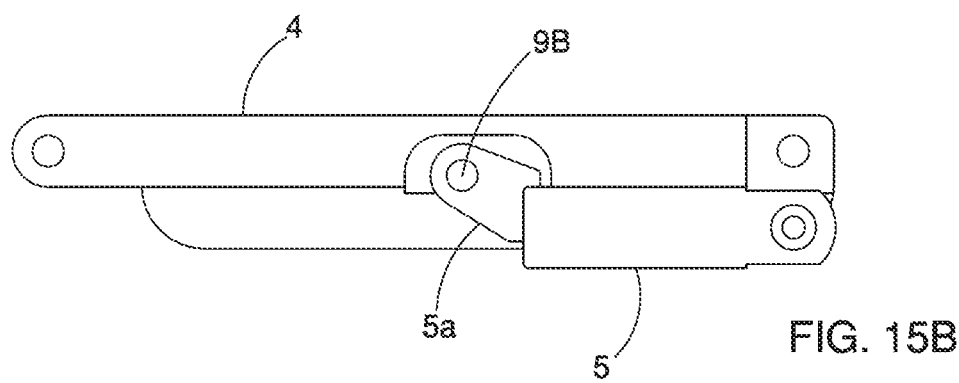
FIG. 15b shows the tail connector of FIG. 15a pivoted into its storage channel flush underneath the tail connecting link.
Figure 16:
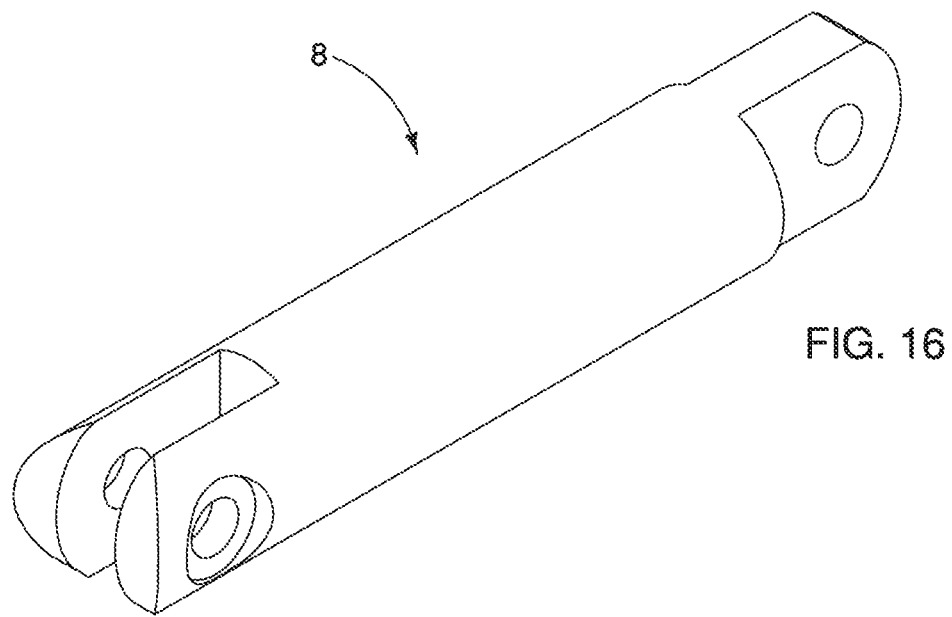
FIG. 16 is a perspective view of an electrically insulating tail section of the weighted tail of FIG. 8.
Figure 17:
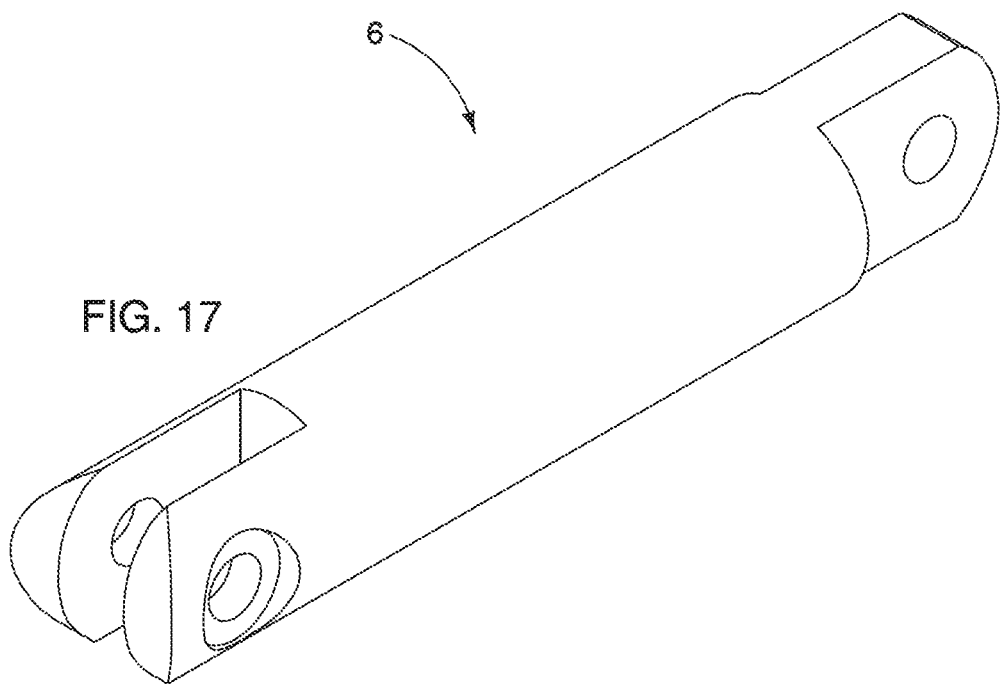
FIG. 17 is a perspective view of a weighted tail section of the weighted tail of FIG. 8.
Figure 18:
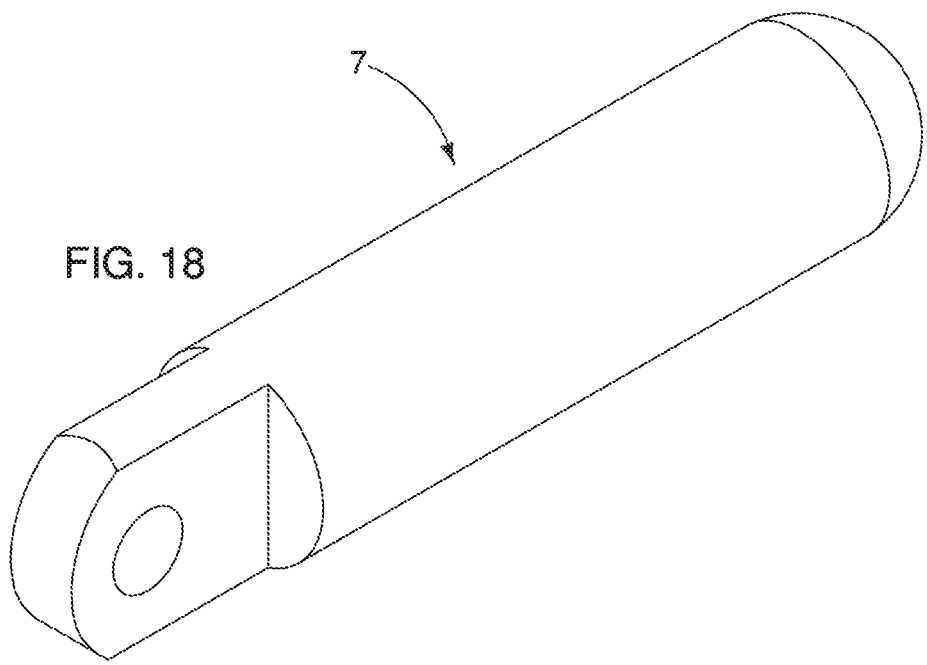
FIG. 18 is a perspective view of a weighted end section of the weighted tail of FIG. 8.

One such tail connector link 4 is shown for example in section view FIGS. 7 and 13. Hinged connections or joints 9A join tail connector links 4 to adjacent tow sections 3 or join tail connector links 4 to front main tow sections 2, made up of front and back main tow sections 2*a* and 2*b* respectively as seen in FIGS. 11 and 12. Front tow section 2*a* is a short link with angled leading edges 15 angled at 45° as seen in FIG. 11 to assist in aligning the anti-rotation device 100 with stringing traveler or sheave 400 on an angle such as seen in FIG. 3, which allows the anti-rotation device 100 to run smoothly through the traveler or sheave 400 without binding. The back or rear tow section 2*b* is a short link that connects front tow section 2*a* to tow section 3 or tail connector link 4. The separate sections 2*a* and 2*b* are coupled by a hinge to provide additional flexibility for the tow component when entering into a traveler or sheave 400. The two front links 2*a* and 2*b* taken together are the same length as the tow sections 3.

The tail connector link 4 includes a hinged connection or joint 9B for connecting the insulated weighted tail 600 to tow component 300, wherein joints 9A and 9B allow up to 90 degrees of rotation. The connection of tow component 300 to insulated weighted tail 600 is a rotating T-junction, rotating in plane of bending A, to allow rotation in, and to constrain rotation to, plane of bending A of insulated weighted tail 600 relative to tow component 300 when free to hang downwardly from the tow component 300.

The insulated weighted tail 600 is preferably made up of one or more different tail sections 5, 8, 11, 6 and 7, in the order as illustrated progressing downwardly in FIG. 2 and as illustrated progressing downwardly along the right-hand tail section in FIG. 9. The tail sections are connected end-to-end to one another in series using hinged connections or joints such as pinned hinges 10 and 12, to provide articulation in the plane-of-bending to the insulated weighted tail 600. Articulation allows the insulated weighted tail 600 to swing in the plane-of-bending A so as to swing away from or towards, while remaining in alignment with, the tow component 300 such as while the anti-rotation device 100 is pulled over traveler or sheave 400, as illustrated in FIGS. 3 and 4.

As noted, insulated weighted tail 600 may advantageously be comprised of different types of tail sections. For example, as seen in FIGS. 2, 4, 7, 8, 15*a* and 15*b*, a dog-leg offset tail connector section 5 may advantageously be used to pivotally connect the insulated weighted tail 600 to the tow component 300 for rotation in the plane of bending A about the tail connector link 4. The offset arm 5*a* of tail connector section 5 provides an offset B as seen in FIG. 7. Offset B between the long axis of tail connector section 5 and hinged connection 9B allows the hinged connection 9B to rotate up to 90° in direction D and to be mounted to a more solid main body of the tail connector link 4 rather than merely passing a hinge pin through the thinner walls of the storage channel 13 formed in the underside of link 4, while still permitting rotation of the tail 600 into its stored position within the storage channel 13 formed in the tow component. With the hinge pin of hinged connection 9B journaled through a thicker part of link 4, the hinge pin is less likely to be torn out of tail connection link 4 from the weight of the insulated weighted tail 600 for example combined with the stress on the pin due to pulling of anti-rotation device 100 through a traveler or sheave, or due to whipping of the corresponding tail component 600.

Each insulated weighted tail 600 includes one or more electrically insulated tail sections 8, releasably connected end-to-end to one another. For example, an insulated tail section 8 may be advantageously pivotally connected directly to, so as to depend from, the dog-leg tail connector 5 as the first or substantially the first of the tail sections in insulated weighted tail 600 as seen progressively extending downwardly from tow component 300. Electrically insulated tail sections 8 may preferably be made of insulated plastic, or fiberglass, or other rigid polymer, ceramic, etc. dielectric compositions so long as tail sections 8 provide electrical insulation between tow component 300 and the electrically conductive weighted tail sections 6 and 7 in insulated weighted tail 600, and so long as they provide sufficient strength in tension and shear. Advantageously the electrically conductive tail sections depending downwardly from the insulated tail sections 8 are made from dense or heavy material such as a dense metal to efficiently provide the resistive moment resisting the twisting of the cable. Insulated tail sections 8 serve to electrically isolate the lower weighted tail sections 6, and 7, from the tow component 300, and may not be of high density as they are not intended to significantly contribute to the counter rotation moment provided by the anti-rotation device 100 as they are mounted too close to the tow component 300 to have a significant moment arm.

The electrically insulated tail section 8, or insulated tail sections 8, if more than one, are advantageously mounted nearest to tail connector link 4. Again, because electrically insulated tail sections 8 are coupled closely adjacent to link 4, the counter-rotational moment they contribute is relatively small due to their shortened moment arm, no matter what they weigh. Thus, they may be of less dense electrically insulating material without significantly affecting the overall counter-moment provided by insulated weighted tail 600. Indeed, if insulated tail sections 8 are made of electrically insulating materials, e.g. plastics, fibreglass, ceramic, etc., and are less dense (weigh less) than weighted tail sections 6 and 7 which are for example made of heavier steel, copper, etc., then mounting insulating tail sections 8 close to tow component 300 allows the heavier weighted tail sections 6 and 7 to be mounted where they have a longer moment arm, thereby collectively increasing the counter rotational moment per tail section. Insulated tail sections 8 provide electrical isolation of the tow component 300 from adjacent conductors in the event that insulated weighted tail 600 flails or whips, for example, upon entering or leaving a sheave, about the longitudinal axis of the tow component 300 so as to swing weighted tail sections 6 and 7 out of the plane A' of sheave 400 as seen in FIG. 3, and over into contact with an adjacent energized conductor or cable. Such an electrically conductive contact with an adjacent energized conductors or cables may have adverse effects on safety. The use of insulated tail sections 8 is intended to assist in avoiding such adverse effects.

A transition 11 pivotally connects the last or lower-most insulated tail section 8 and a first or upper-most weighted tail section 6 for relative rotation between sections 8, 11, and 6 in the plane of bending A. An end section 7 may also be pivotally connected to the lower-most tail section 6, again so as to articulate in the plane-of-bending A relative to tail sections 6.

Hinge connections 9, 10 and 12 may be made with pins, screws, bolts or other suitable rotatable, releasable connectors as may be used to connect the various tow component sections together, the various tail sections together, and the tail component to the tow component to constrain articulation of the tow and tail sections solely to the plane of bending A. Thus advantageously the pivotal connections between sections provide relative movement between adjacent tow sections 2, 3, and 4 and adjacent tail sections 5, 6, 7, and 8 restricted to bending in the plane of bending by the use of hinged connections 9, 10 and 12. As most clearly seen in FIGS. 2, 7 and 9, the hinge connections 10 and 12 allow the respective tow or tail sections to rotate only about an axis of rotation C that is perpendicular to the plane of bending A; wherein the plane of bending A may be defined by the plane containing the length of insulated weighted tail 600 and the length of tow member 300 when the insulated weighted tail 600 is hanging freely vertically downwardly under a suspended tow member 300 when not in motion. Thus as better seen in FIGS. 7 and 15*a*, tail component 600 is free to rotate in direction D relative to tow component 300 about hinge 9B to as to stow tail component 600 into its storage channel 13 in and along the underside of tow component 300.

The hinge connections 9, 10 and 12 resist lateral bending of the insulated weighted tails 600, out of the plane of bending A and thus effectively convey the resistive moment of each insulated weighted tail 600 against rotation of the tow member 300 due to twisting of the cable or wire being pulled. The lateral orientation of the hinge pins, so as to be parallel to axis C, in hinge connections 10 and 12 also inhibits misalignment of the insulated weighted tail 600 between the traveler or sheave and the storage channel 13 formed in and along the bottom or the undersides of tow sections 3 and 4 as both the tow component 300 and the tail component 600 are pulled through the traveler or sheave 400. The tail 600 nests within storage channels 13 in tow sections 3 and 4 during travel of the tail 600 around the sheave 400. Mis-alignment of insulated weighted tail 600 relative to the storage channel 13 during entry of the tail and corresponding tow components into the traveler or sheave may cause the tail to be pinched between the tow component 300 and the traveler or sheave 400 as seen illustrated by way of example in FIG. 3 wherein the misalignment leading to pinching is indicated by the tail component 600 (lying in the plane of bending A) not being aligned with the plane A' containing the traveler or sheave.

In a further preferred embodiment, the present anti-rotation device 100 can be arranged wherein the spacing along tow member 300 between insulated weighted tails 600 is greater, by a predetermined length, than a length of each insulated weighted tail 600. This allows for, during stringing of the cable or wire, more tail sections 6, 7, and 8 to be added to each insulated weighted tail 600. Tail sections 6, 7, and 8 can be added for a number of reasons. Insulating tail sections 8 can be added to increase electrical insulation value between the weighted tail sections 6, and 7 and the tow component 300, for example for re-use of the anti-rotation device 100 in an energized environment at higher voltages. Weighted tail sections 6 can be added to provide further anti-rotational weight to the anti-rotational device 100 in situations where additional weight i.e., more torque resistance, is required, subject to the potential drawbacks of longer insulated weighted sections as discussed below. Such situations can include environmental conditions such as wind, or conditions in the cable such as excessive twisting of the cable when it was spooled on its storage spool or reel and pulling the cable around many corners or turns.

In the embodiment illustrated in FIGS. 2, 5, 6 and 9, the adjacent tail components 600 are separated by nine tow sections 3, and each tail component includes eight electrically insulated tail sections 8 coupled under the tail connector section 5, and eight weighted tail sections 6 (including transition tail section 11) coupled under the insulated tail sections 8. Weighted end section 7 is lowermost, under the weighted tail sections.

Applicant has found during testing that in some instances, depending on the force of the cable twist and the speed with which the anti-rotation device is pulled through the travelers or sheaves, that the number of weighted tail sections could be reduced in number, for example, surprisingly, to only two weighted tail sections 6 without a significant noticeable reduction in the resistance to twisting rotation from the cable being pulled. One benefit of reducing the number of weighted tail sections 6 was that in some cases the lower-most weighted tail sections, and the weighted end section 7, whipped back up and over the lower end of the tail component, as shown by arrow E on the left most tail component in FIG. 9. The force of the whipping motion was sufficient apparently to slightly distort the hinges, including the flanges on the weighted tail sections forming the hinges, so as to allow the whipping of the lowermost weighted tail sections to deflect the lowermost weighted tail sections out of the plane of bending A. The result was a half pretzel-like knot in the lowermost end of the tail component. Removing some or most of the weighted tail sections in each tail component appeared to resolve the whipping issue causing the knotting. The reduction in the length of the tail components then allowed the tow components to be shortened, for example from nine main tow sections 3 to six tow sections 3 between adjacent tail components. In this embodiment then, for each tail component, the electrically insulated tail sections may be described as having a cumulative insulated length and the weighted tail sections as having a cumulative weighted length, wherein in this embodiment the ratio of cumulative insulated length to cumulative weighted length may be 4:1. In the embodiment of FIG. 9, the ratio was 1:1, which appeared to allow for the whipping observed of the lower end of the weighted tail sections.

The previous description of the disclosed embodiments is provided to enable any person skilled in the art to make or use the present disclosure. Various modifications to those embodiments will be readily apparent to those skilled in the art, and the generic principles defined herein may be applied to other embodiments without departing from the spirit or scope of the disclosure. Thus, the present disclosure is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

The invention claimed is:

1. A process for producing an anti-rotation device to resist twisting of a cable or wire as it is strung through a transmission/distribution network and over a sheave in the transmission/distribution network, said device comprising a tow component having at least one tail storage channel formed therein and connectable to the cable or wire at one end, and at least one tail component suspended from the tow component, wherein the at least tail component includes weighted tail sections removably connected end-to-end to one another and at least one electrically insulated tail section pivotally mounted end-to-end to the weighted tail sections between the tow component and the weighted tail sections, and positioned along the tow component so that the at least one tail component is completely nested in and along the at least one tail storage channel as the tow component and the at least one tail component are pulled through the sheave during the stringing of the cable, wherein said device is produced the process comprising:
  a) determining a peak rotational force twisting moment of the cable or wire as it is strung through the transmission/distribution network;
  b) determining a length and distributed weight requirement for the at least one tail component to produce a counter-moment, substantially more than or equal to and counter to the peak rotational force twisting moment of the cable or wire;
  c) providing
    (i) a number of the weighted tail sections determined to meet the length and distributed weight requirement of the at least one tail component, wherein the length requirement of the at least one tail component is constrained by the length of the at least one tail storage channel which extends between adjacent tail components of the at least one tail component mounted on the tow component, and the width is constrained by the width of the at least one tail storage channel, wherein the constrained length and width of the least one tail component, and the material and hence weight of each weighted tail section is determined by the distributed weight requirement to produce the required counter-moment produced by the at least one tail component, and wherein the weighted tail sections are adapted for end-to-end connection to one another, and
    (ii) the at least one electrically insulated tail channel adapted for end-to-end connection to the weighted tail sections, wherein the at least one electrically insulated tail section is of a lower density than the weighted tail sections and is comprised of materials selected from the group of dielectric compositions which include plastics, fibreglass, ceramic, aramid fibres, and
  d) connecting the weighted tail sections and the at least one electrically insulated tail section so as to form the at least one tail component, and connecting the at least one tail component to the tow component, wherein the pivotal end-to-end mounting between the weighted tail sections and the at least one electrically insulated tail section is configured to constrain articulation of the at least one tail component to solely within a single plane of bending of the tow component to thereby cause the at least one tail component to remain aligned with the tow component and the at least one tail storage channel during the pulling through the sheave.

2. The process of claim 1, wherein the tow component is comprised of a plurality of tow sections, releasably and pivotally connected to one another, and constrained by hinged connections for rotation relative to one another only in the single plane of bending of the tow component, and wherein the at least one tail component is a plurality of tail components, spaced apart in a spaced array along the tow component, each of the tail components of the plurality of tail components constrained by hinged connections between the weighted tail sections and the at least one electrically insulated tail section for rotation relative to one another and to the tow component only in the single plane of bending.

3. The process of claim 1, wherein the at least one electrically insulated tail section is located immediately adjacent and adjoined to the tow component.

4. The process of claim 1, wherein the at least one electrically insulated tail section has a cumulative insulated length and the weighted tail sections have a cumulative weighted length, and wherein the ratio of cumulative insulated length to cumulative weighted length is 4:1.

5. The process of claim 1, further comprising connecting a dog leg connector between the at least one electrically insulated tail section and the tow component.

6. An anti-rotation device for resisting rotational twisting of a cable or wire as it is strung in a stringing direction, from an upstream end to a downstream end, through a transmission/distribution network and over a sheave in the transmission/distribution network, the device comprising:
  a) a tow component adapted to be connected to the cable or wire wherein the tow component includes a plurality of tow sections; and
  b) a plurality of elongate tail components suspended from and pivotally mounted to the tow component in a spaced apart array along the tow component, for pivotal rotation of the plurality of elongate tail components between a suspended position, suspended below the tow component, and a pivoted position flush along the tow component, wherein each of the tail components includes:
(i) at least one weighted tail section; and
(ii) at least one electrically insulated tail section connected end-to-end to the at least one weighted tail section, between the at least one weighted tail section and the tow component, wherein the at least one electrically insulated tail section is of a lower density than the at least one weighted tail section and is comprised of materials selected from the group of dielectric compositions which include plastics, fibreglass, ceramic, aramid fibres; and wherein the tail components are spaced along the tow component such that a first length of the tow component between adjacent first and second tail components is at least equal in length to a length of the first tail component, and wherein the first tail component is adapted to be downstream of the second tail component in the stringing direction, and wherein each tow section of the plurality of tow sections has a storage channel formed along the undersides thereof so as to collectively form a linear tail storage channel having a width and a length under and along the tow component, and wherein the width of each tail component is constrainable by the width of the storage channel extending between the adjacent first and second tail components so that the first tail component is snugly received in the storage channel as the tow component and first tail component pass over the sheave, and wherein the constrained length and width of each tail component, and the material of each tail component determines its weight distribution and the amount of counter-moment produced by each tail component, and wherein the spaced apart array of tail components are adapted to provide a counter-moment, counter to the rotational twisting of the cable or wire, and wherein the end-to-end connection between the at least one weighted tail section and the at least one electrically insulated tail section is configured to constrain articulation of each of the tail components to solely within a single plane of bending of the tow component to thereby cause each of the tail components to remain aligned with the tow component and the tail storage channel during the pulling through the sheave.

7. The anti-rotation device of claim 6, wherein the plurality of tow sections are releasably and pivotally connected end-to-end to one another for rotation relative to one another only in the single plane of bending of the tow component.

8. The anti-rotation device of claim 7, wherein the at least one electrically insulated tail section is located adjacent the tow component and the at least one weighted tail section is suspended from the at least one electrically insulated tail section, and wherein the at least one electrically insulated tail section and the at least one weighted tail section are constrained for rotation relative to one another and relative to the tow component only in the single plane of bending of the tow component.

9. The anti-rotation device of claim 8, wherein the at least one electrically insulated tail section includes a plurality of contiguously pivotally mounted electrically insulated tail sections.

10. The anti-rotation device of claim 9, wherein the electrically insulated tail sections and the tow sections are said pivotally mounted by pivoting hinges between each of the tow sections and between each of the electrically insulated tail sections, and between an uppermost end of the tail components and the tow component so as to articulate only in the single plane-of-bending, to thereby remain in alignment with the tail-storage channel in the bottom of the tow component when pulled through the sheave.

11. The anti-rotation device of claim 10, further comprising a dog leg connector pivotally connecting the tail components and the tow component to articulate the tail components in the single plane-of-bending.

12. The anti-rotation device of claim 8, wherein the at least one electrically insulated tail section has a cumulative insulated length and the at least one weighted tail section has a cumulative weighted length, and wherein the ratio of cumulative insulated length to cumulative weighted length is 4:1.

* * * * *